H. AND L. BENZER.
SIDE WIND DEFLECTOR.
APPLICATION FILED JULY 29, 1920.
1,401,942.
Patented Dec. 27, 1921.
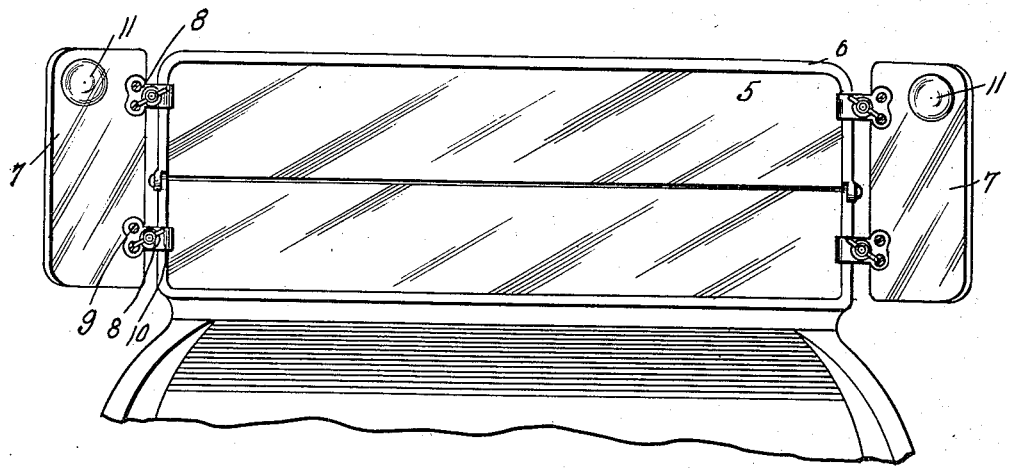
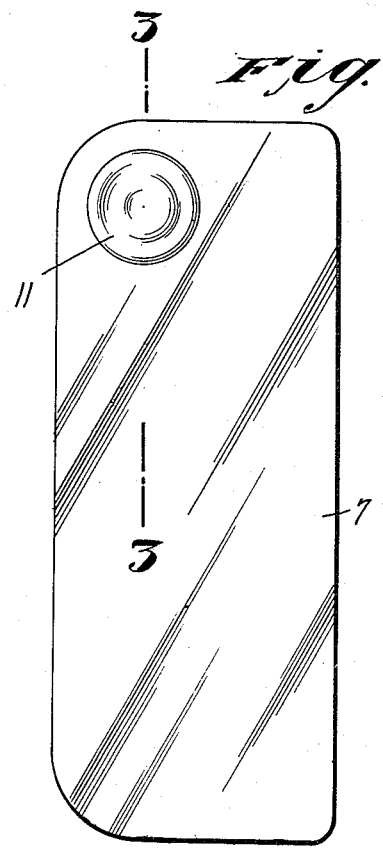
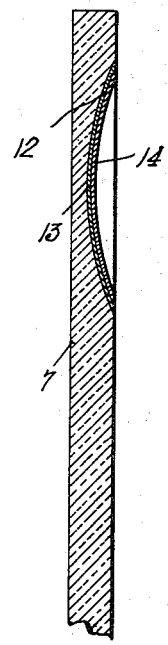
WITNESSES
INVENTORS
LOUIS BENZER
HENRY BENZER
BY
ATTORNEYS

UNITED STATES PATENT OFFICE.

HENRY BENZER AND LOUIS BENZER, OF BROOKLYN, NEW YORK.

SIDE WIND-DEFLECTOR.

1,401,942.　　　　　Specification of Letters Patent.　　Patented Dec. 27, 1921.

Application filed July 29, 1920. Serial No. 399,773.

*To all whom it may concern:*

Be it known that we, HENRY BENZER and LOUIS BENZER, both citizens of the United States, and residents of the city of New York, borough of Brooklyn, in the county of Kings and State of New York, have invented a new and Improved Side Wind-Deflector, of which the following is a full, clear, and exact description.

The present invention relates to new and useful improvements in side wind deflectors commonly placed laterally of the automobile or other vehicle to provide protection to the occupants of the vehicle from wind directed sidewise toward the vehicle.

It is the primary object of the invention to provide a reflecting mirror adapted for use in connection with wind deflectors for windshields.

It is the common practice to support wind deflectors at the ends of windshields and when said wind deflectors are so positioned, they interfere with the proper positioning of a mirror upon the windshield since said mirror prevents the propeller adjustment of the wind deflectors, and it is therefore a further object of the invention to so construct a wind deflector that the ordinary reflecting mirror as separately attached to the windshield may be dispensed with.

It is a still further object of the invention to provide a new and improved form of reflecting mirror.

With the above and other objects in view, reference is had to the accompanying drawings, in which—

Figure 1 is a view in elevation of a wind shield with the wind deflectors attached;

Fig. 2 is a detail view of one of the wind deflectors;

Fig. 3 is a detail longitudinal sectional view taken on the line 3—3 of Fig. 2.

Referring more particularly to the drawings, the reference character 5 designates a windshield and 6 designates its frame. The wind deflectors are shown at 7, and these wind deflectors are secured in place by means of brackets or the like 8, which are secured to the wind deflectors 7 by means of screws or bolts 9, and have clamping jaws 10 for engagement with the frame 6 of the windshield. In the present instance a conventional form of bracket is shown since this forms no part of the invention, and wind deflectors constructed as in the present invention may be mounted on a wind shield in any desired manner without departing from the inventive idea.

Each of the wind deflectors 7 is provided with a reflecting mirror 11, and said reflecting mirror 11 is formed in the transparent body of which the wind deflectors are constructed. The wind deflectors 7 are preferably formed of glass, although it is to be understood that they may be formed of any transparent material.

In carrying out the invention the body of the wind deflector is provided on its rear face with a concavity 12, the material from which the deflector is formed being ground or hollowed out to form this recess. After the recess is formed, it is silvered as indicated by the reference character 13, and the silvered surface is backed up by means of a coating of water-proof paint or other suitable material 14. By such a construction, it is apparent that the mirror 11 when viewed through the plane face of the glass will have a convex reflecting surface and will therefore be of the reducing type.

By constructing a mirror in the manner heretofore set forth, a clearer reflecting surface is had since the transparent body from which the mirror is formed is in no manner disturbed as is the case when the transparent material is formed by bending as is the common practice in constructing mirrors of this type.

By this construction it is also apparent that the wind deflectors may be adjusted with respect to the windshield so that the mirror of each wind deflector may reflect the presence of vehicles at the rear of their respective sides of the car to which they are attached, or upon adjustment of the wind deflector 7 inwardly of the car, the mirror of each wind deflector will reflect objects on the side of the car opposite to each respective mirror, thus making the device capable of use to any angle to which it may be adjusted.

Claims:

1. A side wind deflector for vehicles comprising a plate of non-reflecting transparent material, mirror means carried by said plate at a determined distance from the outer edge thereof, said mirror means having a relatively restricted area as compared to the area of said non-reflecting transparent plate, and means for securing said plate to the vehicle, said securing means being attached to said plate at a distance from the said outer edge greater than said determined distance.

2. A side wind deflector for vehicles comprising a plate of non-reflecting transparent material, mirror means secured to said plate at a determined distance from the outer vertical edge thereof, said mirror means having an area materially less than the area of said non-reflecting transparent plate, and means for securing said plate to the vehicle, said securing means being attached to said plate remote from said mirror means.

3. A side wind deflector for vehicles comprising a plate of non-reflecting transparent material, a portion of said plate remote from the outer edge of said plate being silvered to provide a reflecting surface, said silvered portion having an area materially less than the area of the non-reflecting portion of said plate, and means for securing said plate to the vehicle, said securing means being attached to said plate at a distance from said outer edge greater than the distance of said mirrored portion from said outer edge.

HENRY BENZER.
LOUIS BENZER.